(12) United States Patent
Carthew et al.

(10) Patent No.: US 11,609,581 B2
(45) Date of Patent: Mar. 21, 2023

(54) UAV LANDING SYSTEMS AND METHODS

(71) Applicant: Ford Global Technologies, LLC, Dearborn, MI (US)

(72) Inventors: James Carthew, Dearborn, MI (US); Aditya Singh, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 336 days.

(21) Appl. No.: 16/765,272

(22) PCT Filed: Nov. 29, 2017

(86) PCT No.: PCT/US2017/063686
§ 371 (c)(1),
(2) Date: May 19, 2020

(87) PCT Pub. No.: WO2019/108174
PCT Pub. Date: Jun. 6, 2019

(65) Prior Publication Data
US 2020/0310465 A1    Oct. 1, 2020

(51) Int. Cl.
*G05D 1/06* (2006.01)
*B64C 39/02* (2006.01)

(52) U.S. Cl.
CPC ......... *G05D 1/0684* (2013.01); *B64C 39/024* (2013.01); *B64C 2201/066* (2013.01); *B64C 2201/128* (2013.01); *B64C 2201/18* (2013.01); *B64C 2201/208* (2013.01)

(58) Field of Classification Search
None
See application file for complete search history.

(56) References Cited

U.S. PATENT DOCUMENTS

| 3,527,336 | A | 9/1970 | Johnston |
| 4,621,562 | A | 11/1986 | Carr et al. |
| 2011/0068224 | A1 | 3/2011 | Kang et al. |
| 2014/0319272 | A1* | 10/2014 | Casado Magana ..... B60L 50/52 244/110 E |
| 2017/0096222 | A1* | 4/2017 | Spinelli ................... B64F 1/222 |
| 2017/0225802 | A1 | 8/2017 | Lussier et al. |
| 2017/0313421 | A1* | 11/2017 | Gil ............................ B64F 1/32 |
| 2021/0197983 | A1* | 7/2021 | Wang ......................... B60S 5/06 |
| 2021/0321810 | A1* | 10/2021 | Sun .......................... B64F 1/324 |

FOREIGN PATENT DOCUMENTS

| CN | 104979882 A | 10/2015 |
| CN | 205004789 U | 1/2016 |

OTHER PUBLICATIONS

International Search Report of the International Searching Authority for PCT/US2017/063686 dated Feb. 9, 2018.

* cited by examiner

*Primary Examiner* — Thomas E Worden
(74) *Attorney, Agent, or Firm* — Brandon Hicks; Eversheds Sutherland (US) LLP

(57) ABSTRACT

Example UAV landing systems and methods are described. In one implementation, a landing platform includes a conveyor belt capable of supporting an unmanned aerial vehicle (UAV). The conveyor belt can move in a first direction and a second direction that is opposite the first direction. The landing platform also includes a first positioning bumper and a second positioning bumper, where the first positioning bumper and the second positioning bumper are capable of repositioning the UAV on the conveyor belt. The landing platform further includes a cradle that can receive and secure the UAV.

20 Claims, 7 Drawing Sheets

UAV LANDING SYSTEMS AND METHODS

TECHNICAL FIELD

The present disclosure relates to systems and methods that support the landing and positioning of unmanned aerial vehicles (UAVs).

BACKGROUND

Landing an unmanned aerial vehicle (UAV) at a specific location can be difficult. Precise landing locations are hindered by turbulence generated by the air displaced by the UAV's propellers and reflected by the landing surface. If the UAV is landing on a moving surface, such as a moving vehicle, precision landings become more difficult. In many situations, a UAV must be precisely positioned to successfully load/unload payload, attach charging systems, and the like. Thus, it is necessary to properly position a UAV on a landing platform to support loading/unloading payload and other activities.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
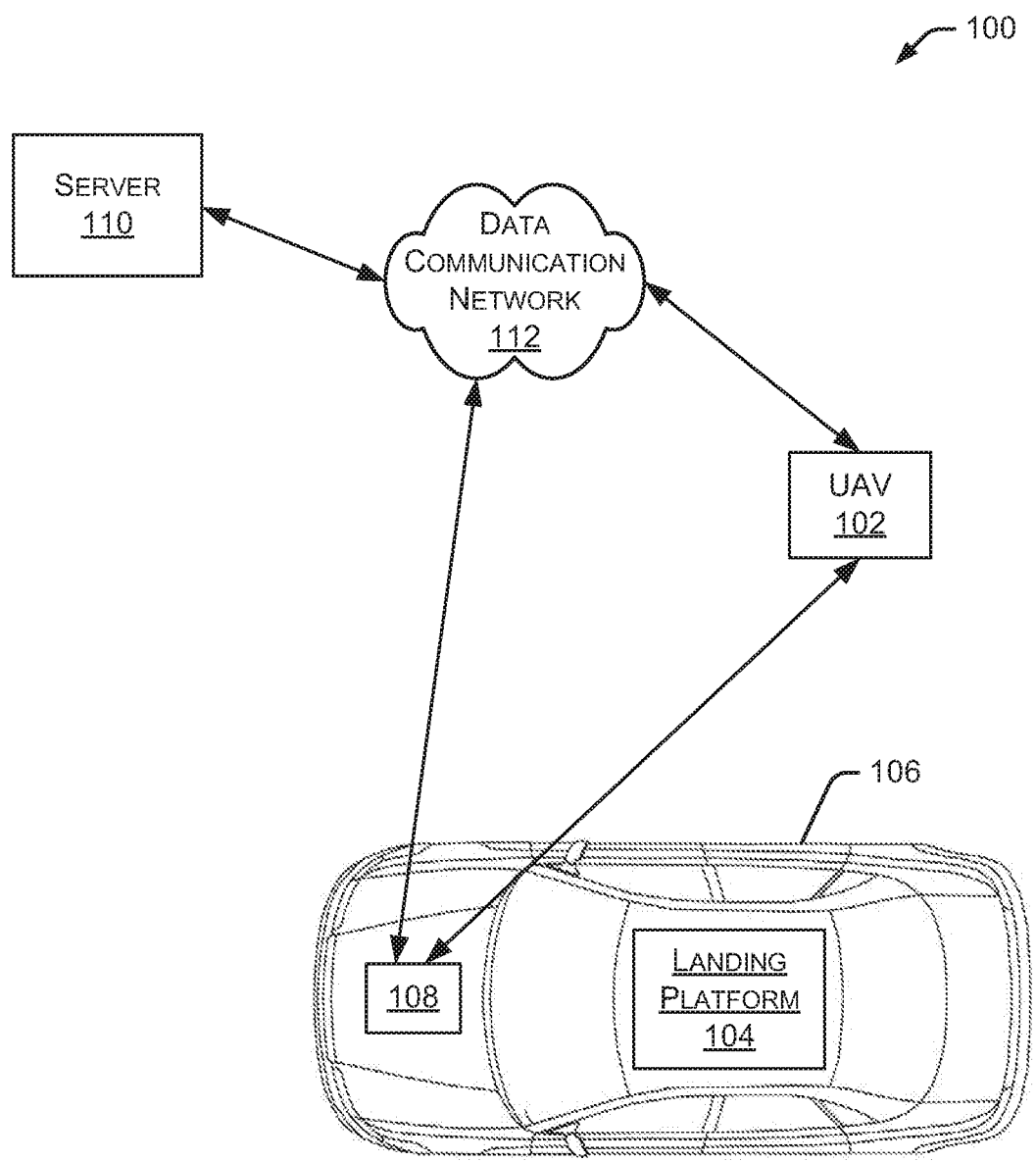
FIG. 1 is a block diagram depicting an environment within which an example embodiment may be implemented.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram depicting an environment 100 within which an example embodiment may be implemented. An unmanned aerial vehicle (UAV) 102 may land on, and take off from, a landing platform 104 mounted to a vehicle 106 (e.g., mounted to the roof of vehicle 106). Vehicle 106 may be any type of vehicle, such as a car, truck, van, bus, train, and the like. In some embodiments, vehicle 106 may be moving while UAV 102 lands on landing platform 104. In particular implementations, vehicle 106 is a delivery vehicle that carries at least one item to be delivered by UAV 102. In alternate embodiments, landing platform 104 may be mounted to any type of device or structure, such as a building, loading dock, loading platform, and the like. UAV 102 can be any type of unmanned aerial vehicle capable of maneuvering to land on, and take off from, any type of landing platform. In some embodiments, UAV 102 is a multicopter having two or more rotors (e.g., motors) and associated propellers. In particular implementations, UAV 102 has a single rotor and associated propeller. UAV 102 may also be referred to as a drone or a remotely piloted aircraft. As discussed in greater detail herein, landing platform 104 provides a temporary location for one or more UAVs 102 to land and receive payload, deliver payload, recharge, "piggy back" on vehicle 106, transfer data to or from UAV 102 (e.g., image data collected by UAV 102) and the like.

As shown in FIG. 1, vehicle 106 includes a UAV management system 108 that is capable of wirelessly communicating with UAV 102. Any communication protocol may be used for communications between UAV management system 108 and UAV 102, such as 3G, 4G LTE, WiFi and the like. In some embodiments, UAV management system 108 provides flight guidance to UAV 102 when landing on, or taking off from, landing platform 104. Additionally, UAV management system 108 may provide instructions to landing platform 104 to position and orient UAV 102 on landing platform 104, and move UAV 102 to a cradle, as discussed herein. In some embodiments, UAV management system 108 communicates with a server 110 via a data communication network 112. For example, UAV management system 108 may communicate data associated with UAV 102, vehicle 106, payload, and the like to server 110. Additionally, UAV management system 108 may receive data from server 110 associated with UAV 102, payload delivery instructions, and the like. Other types of data received by UAV management system 108 may include a calculated flight path for UAV 102, temporary flight restrictions, airspace flight restrictions, and localized models of obstructions near the delivery or in the flight path of UAV 102. Although landing platform 104 and UAV management system 108 are shown in FIG. 1 as separate systems or devices, in alternate embodiments management system 108 is integrated into landing platform 104.

Data communication network 112 includes any type of network topology using any communication protocol. Additionally, data communication network 112 may include a combination of two or more communication networks. In some embodiments, data communication network 112 includes a cellular communication network, the Internet, a local area network, a wide area network, or any other communication network.

In some embodiments, UAV 102 communicates directly with UAV management system 108. In other embodiments, UAV 102 communicates with server 110, which then communicates with UAV management system 108.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
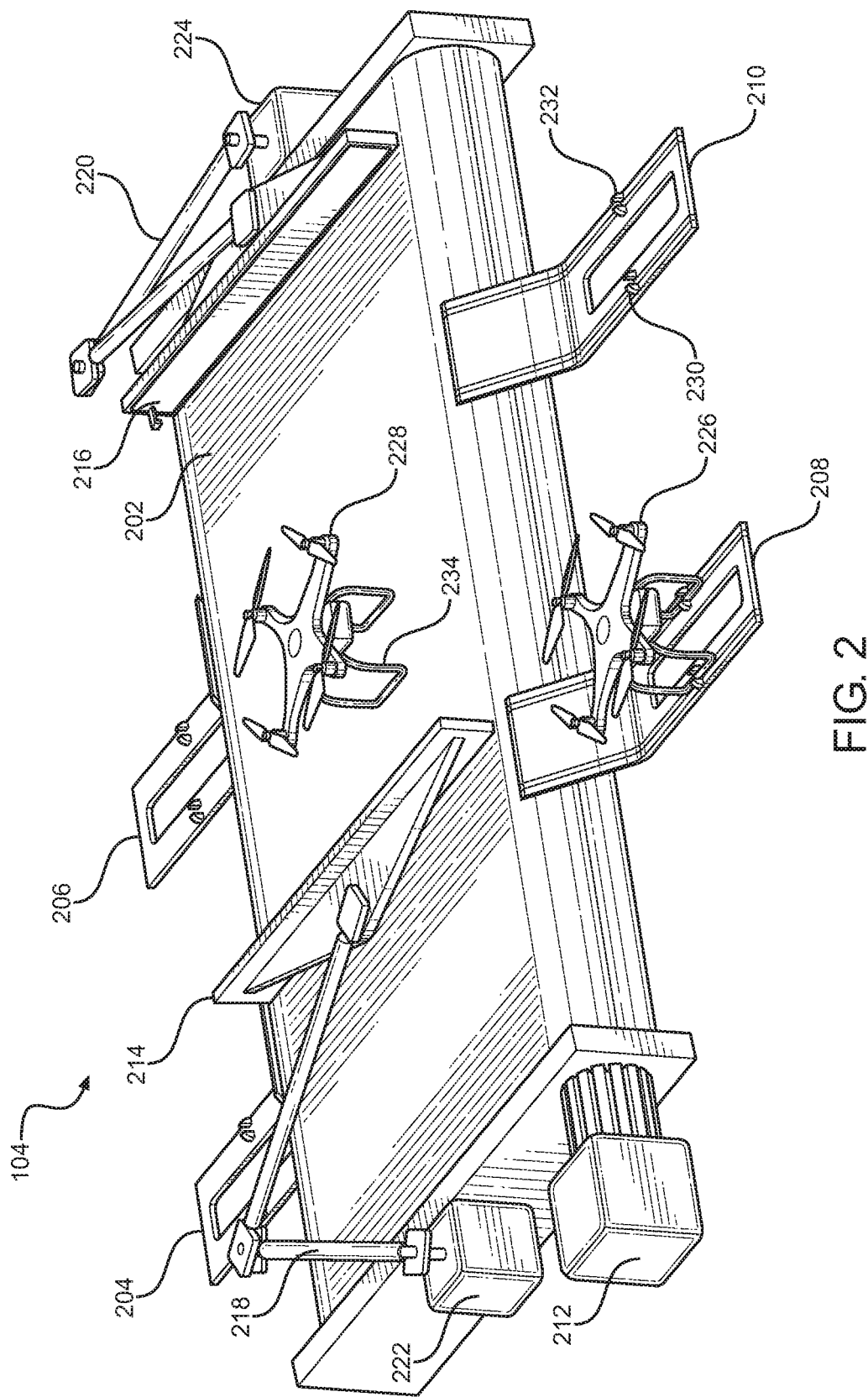
FIG. 2 illustrates an embodiment of a landing platform capable of receiving an unmanned aerial vehicle.

FIG. 2 illustrates an embodiment of landing platform 104 capable of receiving one or more UAVs. Landing platform 104 includes a conveyor belt 202 that is capable of moving in a forward and a reverse direction. For example, in a forward direction, conveyor belt 202 moves a UAV 228 located on conveyor belt 202 toward a UAV cradle 210. In a reverse direction, conveyor belt 202 moves UAV 228 toward a UAV cradle 206. In some embodiments, conveyor belt 202 is made from a corrugated material such that the direction of the corrugation lines is orthogonal to the direction of travel of conveyor belt 202. This configuration allows for slippage of a UAV on conveyor belt 202 in the orthogonal direction while reducing slippage in the direction of travel of conveyor belt 202. In some embodiments, conveyor belt 202 is manufactured using corrugated rubber, corrugated PVC (Polyvinyl Chloride), corrugated vinyl, and the like.

The movement of conveyor belt 202 is performed by a conveyor belt motor 212 that rotates a roller (not shown) or other mechanism that is in contact with conveyor belt 202. As conveyor belt motor 212 rotates the roller, conveyor belt 202 moves due to the friction contact between the roller and the conveyor belt. In some embodiments, conveyor belt motor 212 is an electric motor. In some implementations, the size of the roller is determined based on the strength of conveyor belt 202, the size of conveyor belt 202, and the torque required to move the UAVs landing on conveyor belt 202.

As shown in FIG. 2, landing platform 104 has four UAV cradles 204, 206, 208, and 210. Each UAV cradle 204-210 is capable of receiving a UAV that has landed on conveyor belt 202. For example, UAV cradle 208 has received a UAV 226 that previously landed on conveyor belt 202 and was reoriented and repositioned to align with UAV cradle 208. In some embodiments, after a UAV (such as UAV 226) has landed on conveyor belt 202, a pair of positioning bumpers 214 and 216 are manipulated to reorient and reposition the UAV on conveyor belt 202. Reorienting the UAV may be necessary to ensure that the UAV is properly oriented when it is received by a UAV cradle. For example, a specific orientation of the UAV in the UAV cradle may be necessary to allow for loading or unloading of payload objects carried by the UAV, to allow for charging of the UAV, transfer data to or from the UAV, and the like. Similarly, the UAV may need to be repositioned on conveyor belt 202 so the UAV properly aligns with the UAV cradle when conveyor belt 202 is moved to place the UAV into the UAV cradle. The process of reorienting and repositioning UAVs on conveyor belt 202 is discussed in greater detail below.

In some embodiments, positioning bumpers 214, 216 are articulated to reduce the space envelope occupied by the positioning bumpers. As shown in the example of FIG. 2, each positioning bumper 214, 216 has an associated bumper arm 218, 220, respectively. Additionally, each positioning bumper 214, 216 has an associated bumper motor 222, 224, respectively, that moves bumper arms 218, 220, thereby moving the associated positioning bumper 214, 216. In some embodiments, bumper motors 222, 224 are electric motors. In particular implementations, positioning bumpers 214, 216 are moved to a retracted position (e.g., the position of positioning bumper 216 shown in FIG. 2) when a UAV is landing on conveyor belt 202, which provides a large, unobstructed landing area for the UAV. After the UAV has landed on conveyor belt 202, one or more of positioning bumpers 214, 216 may be activated to reposition and/or reorient the UAV on conveyor belt 202.

In some embodiments, the UAV has a specific support structure that engages with securing mechanisms on the UAV cradles. For example, UAV 228 has a support structure 234 that includes two legs that support UAV 228 after landing on conveyor belt 202. Support structure 234 has a size and shape that engages with mechanical graspers 230 and 232 shown on UAV cradle 210. In the example of FIG. 2, the bottom portions of support structure 234 align with mechanical graspers 230, 232 such that mechanical graspers 230, 232 grasp the bottom portions of support structure 234, thereby securing the UAV to the UAV cradle. UAV 226 is shown in an engaged configuration with UAV cradle 208. In some embodiments, each UAV cradle 204-210 includes gutters along the outer edges that align with support structure 234. These gutters assist in guiding the UAV onto the UAV cradle. In some implementations, a rotating slot/key mechanism is used instead of the mechanical graspers to secure the UAV on the UAV cradle. In particular embodiments, one or more drive belts may be used with each UAV cradle to pull the UAV into the proper position on the UAV cradle. In alternate embodiments, any mechanism can be used to secure the UAV, such as arms or other mechanisms that hold a UAV in a specific location, electromagnets that are activated to secure a UAV, and the like.

As shown in FIG. 2, UAV cradles 204-210 have apertures that allow for accessing the bottom of the UAV, which typically carries payload or has recharging ports. Thus, the apertures in UAV cradles 204-210 allow for loading or unloading of payload objects carried by the UAV, allow for charging of the UAV, allow for transferring data to or from the UAV and the like while the UAV is attached to a UAV cradle.

Figure 3A:
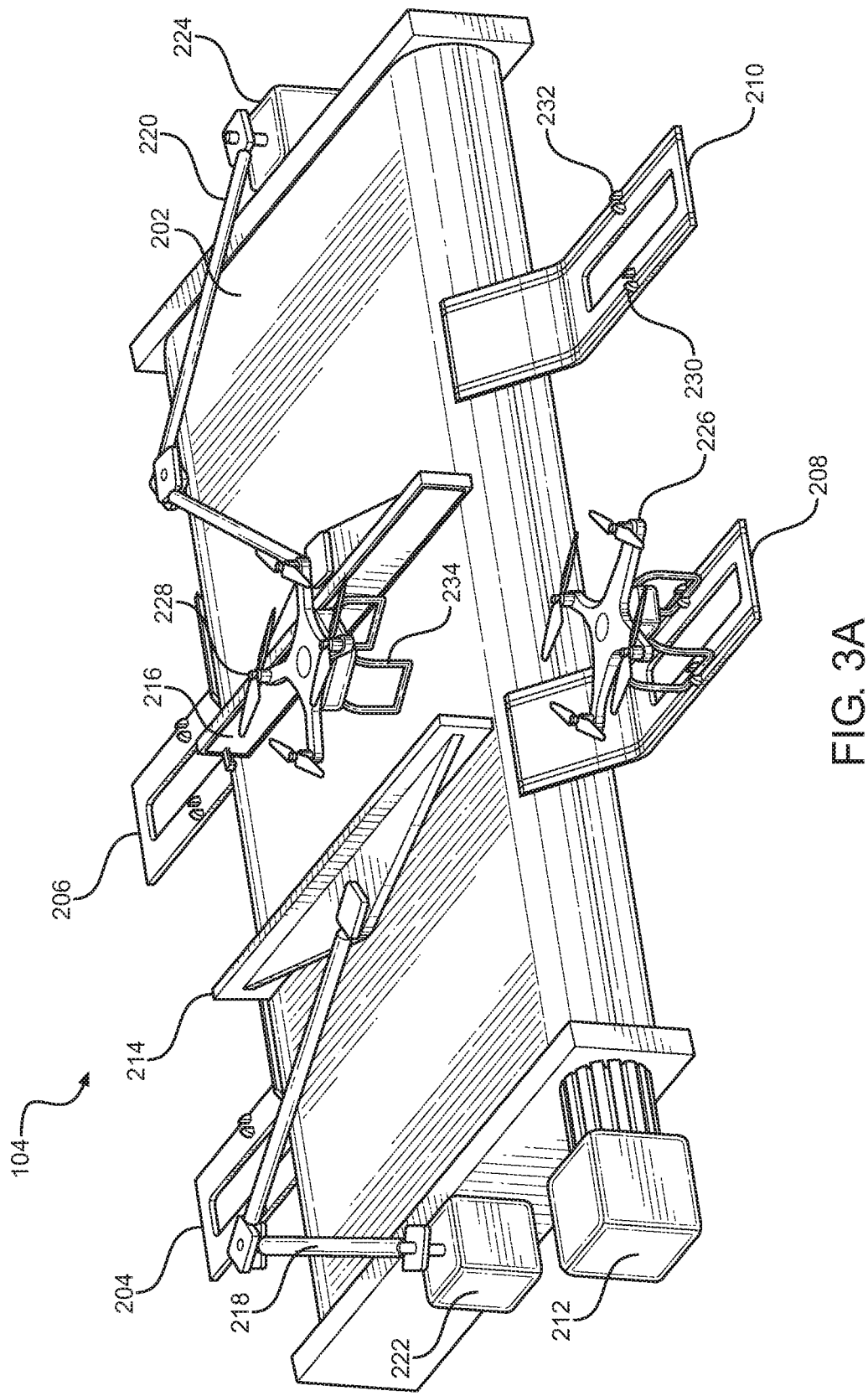
FIGS. 3A and 3B illustrate the landing platform of FIG. 2 including two positioning bumpers that adjust the orientation of the UAV on the landing platform.
Figure 3B:
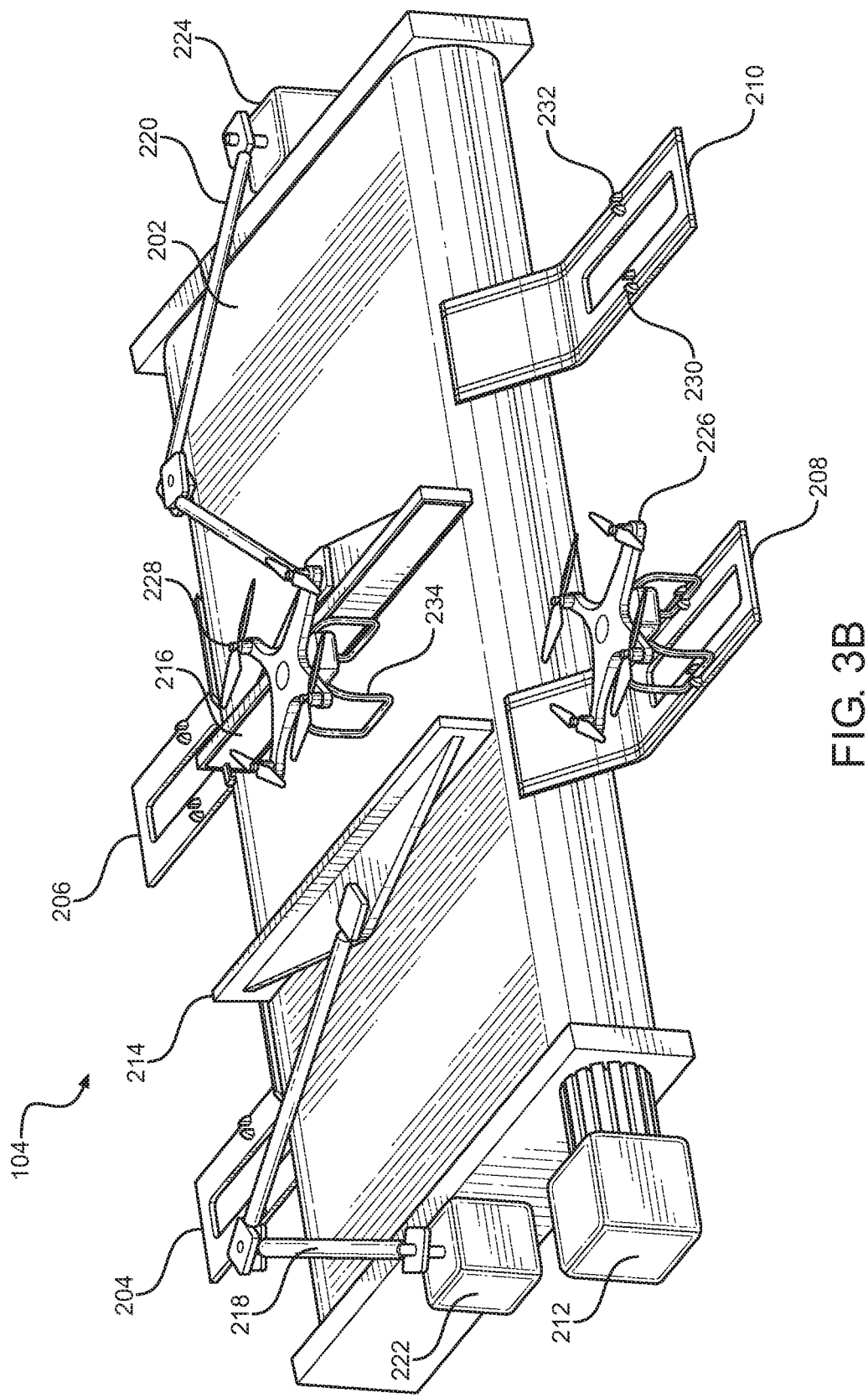

FIGS. 3A and 3B illustrate the landing platform of FIG. 2 including two positioning bumpers that adjust the orientation of the UAV on the landing platform. FIG. 3A illustrates UAV 228 after landing on conveyor belt 202. The orientation of UAV 228 is not properly aligned to slide into UAV cradle 204, 206, or 210. Note that UAV 228 cannot slide into UAV cradle 208 because it is already occupied by UAV 226. To allow UAV 228 to properly slide into UAV cradle 204, 206, or 210, the orientation of UAV 228 needs to be adjusted such that support structure 234 aligns with the UAV cradle that will receive UAV 228. As shown in FIG. 3A, the portions of support structure 234 in contact with conveyor belt 202 are not aligned to properly engage UAV cradle 204, 206, or 210. The portions of support structure 234 in contact with conveyor belt 202 need to have substantially the same angle as the axis along the length of UAV cradle 204, 206, or 210. In the example of FIG. 3A, the portions of support structure 234 in contact with conveyor belt 202 have a different angle than the axis along the length of UAV cradle 204, 206, or 210. Thus, if UAV 228 was moved by conveyor belt 202 toward one of the available UAV cradles (204, 206, or 210), the support structure 234 would not align with the UAV cradle, which may cause UAV 228 to fall off platform 104 instead of engaging the UAV cradle.

As shown in FIG. 3A, positioning bumper 216 has been moved to be adjacent to UAV 228 in preparation for adjusting the orientation of UAV 228. FIG. 3B illustrates UAV 228 after it has been reoriented such that the portions of support structure 234 in contact with conveyor belt 202 are aligned with the axis along the length of UAV cradle 204, 206, or 210. In some embodiments, this reorientation is performed using a combination of positioning bumper 216 and movement of conveyor belt 202. For example, positioning bumper 216 acts as a pivot point and the movement of conveyor belt 202 pulls (or pushes) UAV 228 into the desired orientation. In some embodiments, the desired orientation of support structure 234 in contact with conveyor belt 202 is substantially the same as the angle of positioning bumper 216. Thus, if the support structure 234 in contact with conveyor belt 202 is pushed against positioning bumper 216, UAV 228 will have the proper orientation to be received by any UAV cradle.

After UAV 228 is in the proper orientation, positioning bumper 214 or 216 may reposition UAV 228 laterally on conveyor belt 202 so that UAV 228 aligns with the UAV cradle that will receive UAV 228 (e.g., UAV cradle 204, 206, or 210). In the example of FIG. 3B, if UAV 228 is to be received by UAV cradle 204, then positioning bumper 216 repositions UAV 228 laterally on conveyor belt 202 by pushing UAV 228 until it aligns with UAV cradle 204. Additionally, positioning bumper 214 is retracted so it does not interfere with the repositioning of UAV 228. When UAV 228 is aligned with UAV cradle 204, conveyor belt 202 is activated in the proper direction to move UAV 228 to the edge of landing platform 104, causing UAV 228 to slide into UAV cradle 204.

In another example, if UAV 228 shown in FIG. 3B is to be received by UAV cradle 210, then positioning bumper 214 repositions UAV 228 laterally on conveyor belt 202 by pushing UAV 228 until it aligns with UAV cradle 210. Additionally, positioning bumper 216 is retracted so it does not interfere with the repositioning of UAV 228. When UAV 228 is aligned with UAV cradle 210, conveyor belt 202 is activated in the proper direction to move UAV 228 to the edge of landing platform 104, causing UAV 228 to slide into UAV cradle 210.

Figure 4:
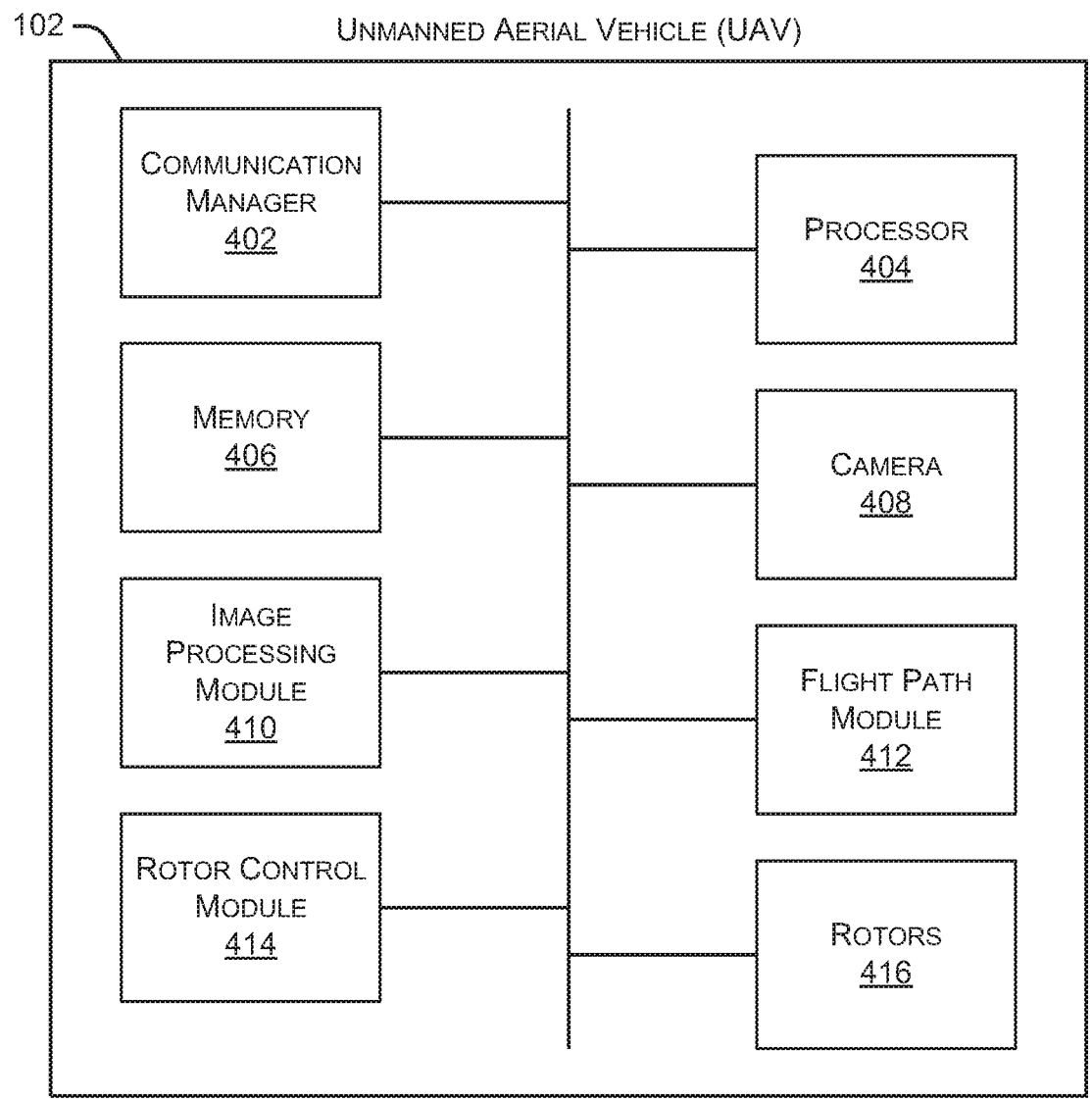
FIG. 4 is a block diagram illustrating an embodiment of an unmanned aerial vehicle.

FIG. 4 is a block diagram illustrating an embodiment of UAV 102. As shown in FIG. 4, UAV 102 includes a communication manager 402, a processor 404, and a memory 406. Communication manager 402 allows UAV 102 to communicate with other systems, such as UAV management system 108, server 110, data communication network 112, and the like. Processor 404 executes various instructions to implement the functionality provided by UAV 102, as discussed herein. Memory 406 stores these instructions as well as other data used by processor 404 and other modules and components contained in UAV 102.

UAV 102 also includes a camera 408 that captures images of the areas near UAV 102. In some embodiments, an image processing module 410 analyzes images captured by camera 408 to locate landing platforms, delivery areas, obstacles, and the like. Additionally, image processing module 410 may assist with landing UAV 102 by identifying a landing platform (or other delivery area) location and determining flight adjustments needed to successfully land UAV 102 on the landing platform. A flight path module 412 generates and maintains information related to a flight path that UAV 102 attempts to follow. In some embodiments, the flight path information is received from UAV management system 108 or server 110. A rotor control module 414 controls the operation of multiple rotors 416 associated with UAV 102. In some embodiments, UAV 102 has three or four rotors 416 that assist UAV 102 in flying between multiple locations. For example, rotor control module 414 may control the rotational speed of each rotor 416 to steer and maneuver UAV 102 to a destination, such as a landing platform or delivery location. Thus, rotor control module 414 can assist in maneuvering UAV 102 along a particular flight path, avoiding obstacles, and the like. In particular embodiments, one or more of the functions performed by rotor control module 414 are, instead, performed by UAV management system 108 or server 110, which sends appropriate rotor control instructions to rotor control module 414 for implementation. A particular UAV 102 may have any number of rotors 416.

Figure 5:
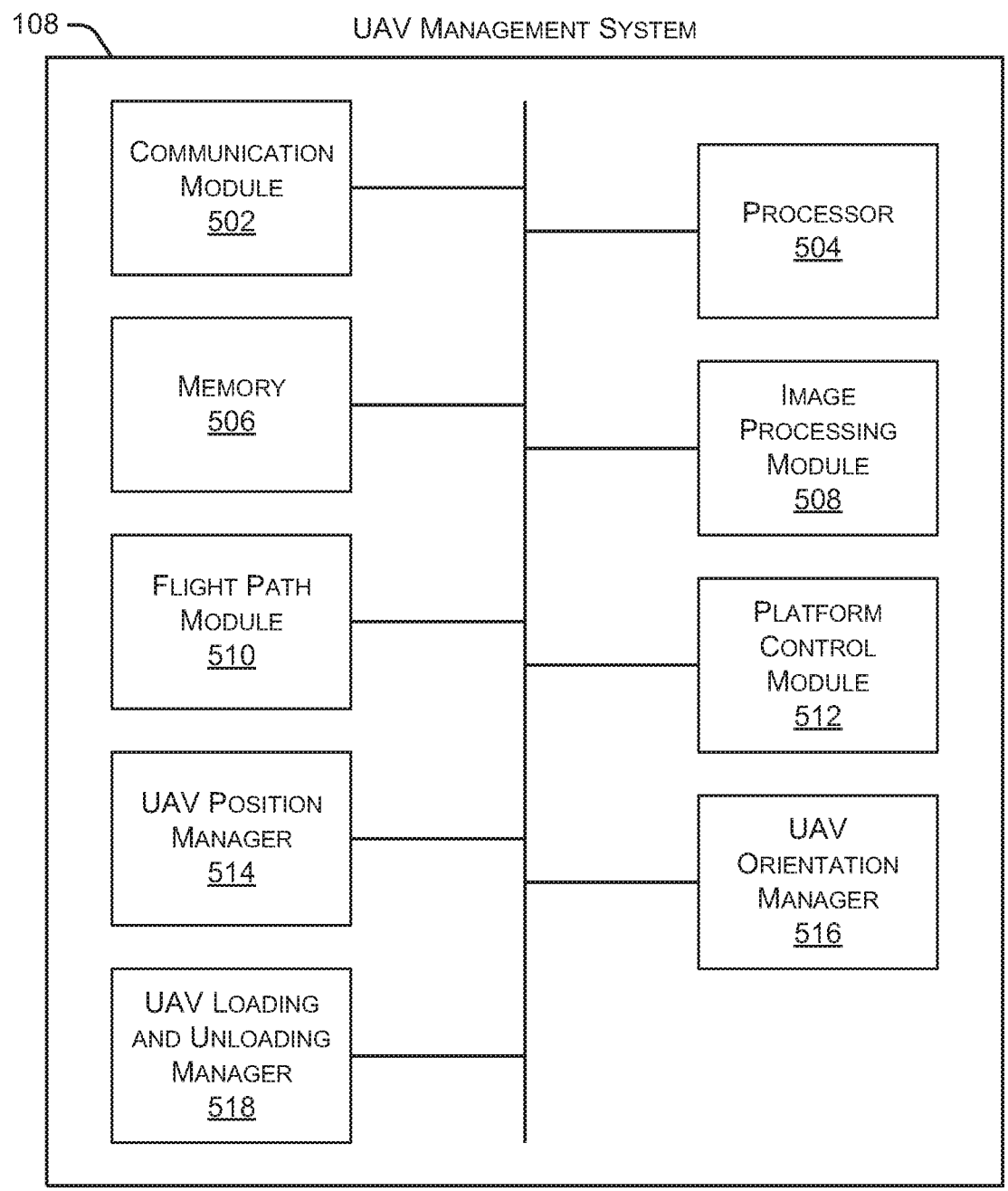
FIG. 5 is a block diagram illustrating an embodiment of a UAV management system.

FIG. 5 is a block diagram illustrating an embodiment of UAV management system 108. As shown in FIG. 5, UAV management system 108 includes a communication module 502, a processor 504, and a memory 506. Communication module 502 allows UAV management system 108 to communicate with other systems and devices, such as UAV 102, server 110, data communication network 112, and the like. Processor 504 executes various instructions to implement the functionality provided by UAV management system 108, as discussed herein. Memory 506 stores these instructions as well as other data used by processor 504 and other modules and components contained in UAV management system 108.

UAV management system 108 also includes an image processing module 508 that analyzes images captured, for example, by camera 408 in UAV 102. Image processing module 508 may assist with landing UAV 102 by identifying the location and trajectory of UAV 102 with respect to landing platform 104, and determining flight adjustments needed to successfully land UAV 102 on landing platform 104. A flight path module 510 generates and maintains information related to a flight path that UAV 102 attempts to follow.

A platform control module 512 manages the operation of landing platform 104, such as reorienting and repositioning UAV 102 after landing on conveyor belt 202 of landing platform 104. Platform control module 512 may also control the movement of conveyor belt 202 and positioning bumpers 214, 216. A UAV position manager 514 may work in combination with platform control module 512 to reorient and reposition UAV 102 so it is properly oriented and properly positioned to be received by a specific UAV cradle. A UAV orientation manager 516 adjusts the orientation of UAV 102, if necessary, so it is oriented properly to load/unload payload, access a UAV recharging system, transfer data, and the like when received by the UAV cradle. A UAV loading and unloading manager 518 assists with the loading and unloading of payload carried by UAV 102.

Figure 6:
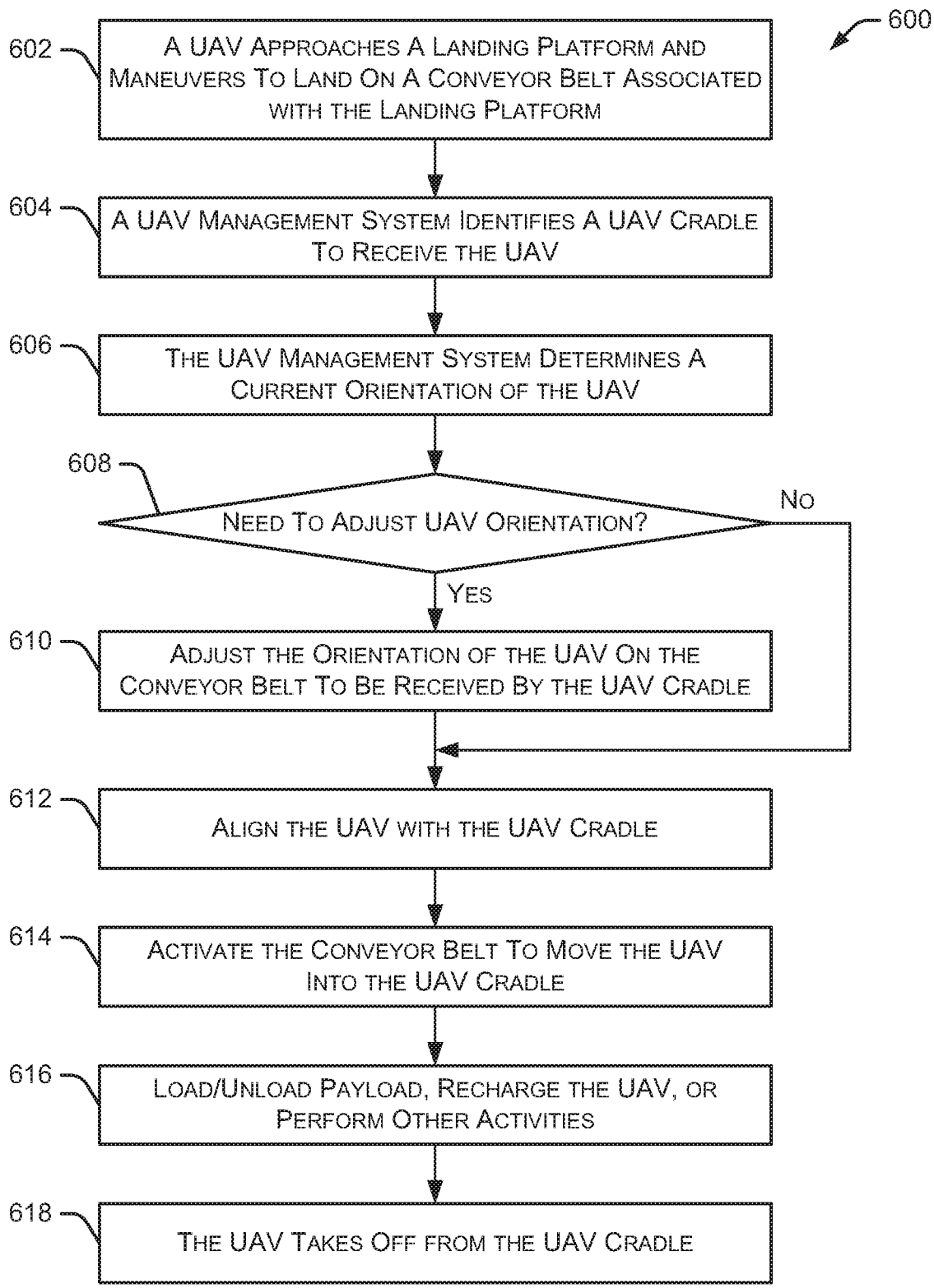
FIG. 6 is a flow diagram illustrating an embodiment of a method for landing, positioning, and moving an unmanned aerial vehicle on a landing platform.

FIG. 6 is a flow diagram illustrating an embodiment of a method 600 for landing, positioning, and moving an unmanned aerial vehicle on a landing platform. Initially, a UAV approaches 602 a landing platform and maneuvers to land on a conveyor belt associated with the landing platform. After the UAV lands on the conveyor belt, a UAV management system identifies 604 a UAV cradle (e.g., UAV cradle 204-210) to receive the UAV. When determining which UAV cradle to use for a particular UAV, the UAV management system may consider one or more criteria, such as the availability of a UAV cradle, the geometry of the UAV (including landing gear geometry), orientation of the UAV (e.g., is it facing forward or backward), and operational requirements of the UAV (e.g., charging, payload loading/unloading, or data transfer). The UAV management system then determines 606 a current orientation of the UAV (e.g., the orientation of the UAV with respect to one or more UAV cradles). Based on the current orientation of the UAV, the UAV management system determines 608 whether the UAV's orientation needs to be adjusted. As discussed herein, the orientation of the UAV when received by the UAV cradle may require a specific orientation (or range of orientations) to properly load/unload payload, recharge the UAV, transfer data, and the like. If the UAV's current orientation is not correct (or not within a specified range of acceptable orientations), the orientation of the UAV on the conveyor belt is adjusted 610 so the UAV can be properly received by the UAV cradle. In some embodiments, the rotational orientation of the UAV can be corrected within a +/−45 degree angle using a combination of a positioning bumper and movement of the conveyor belt, as discussed herein. The positioning bumper acts as a pivot point and the movement of the conveyor belt pulls (or pushes) the UAV into the desired orientation. After the UAV is in the desired orientation, one of the positioning bumpers may reposition the UAV laterally on the conveyor belt so the UAV aligns with the identified UAV cradle that will receive the UAV.

When the UAV is oriented properly, method 600 continues by aligning 612 the UAV with the UAV cradle. This alignment is performed using one or both positioning bumpers to move the UAV on the conveyor belt. The UAV is aligned correctly when movement of the conveyor belt causes the UAV to be received by a particular UAV cradle. In some embodiments, alignment of the UAV include moving the UAV in a direction that is orthogonal to the movement of the conveyor belt.

When the UAV is in alignment with a particular UAV cradle, the conveyor belt is activated 614 to move the UAV into the particular UAV cradle. In some embodiments, the UAV "falls into" the UAV cradle (or slides into the UAV cradle) when it reaches the edge of the conveyor belt. In some embodiments, the UAV cradle includes a ramp, rails, or slide mechanism to guide the UAV from the edge of the conveyor belt into the UAV cradle. After the UAV is moved into the UAV cradle, at 616, the method loads/unloads payload, charges the UAV, transfers data, or performs other activities associated with the UAV. When the activities are finished, the UAV takes off 618 from the UAV cradle and flies to another location. Additionally, after the UAV is moved into the UAV cradle, at 616, the landing platform is ready to allow another UAV to land on the conveyor belt. Thus, the first UAV that has been moved into the cradle can be serviced (e.g., load/unload payload, recharge, or transfer data) while one or more additional UAVs land on the conveyor belt and are moved to identified UAV cradles.

In some embodiments, an IR (infrared) beacon is positioned on the positioning bumper facing across the bumper surface (i.e., the bumper surface that contacts a UAV). If the positioning bumper contacts any object, that object will have passed through the IR beam, which provides for localization of the UAV on the conveyor belt. This configuration supports fast movement of the positioning bumpers when they are not close to a UAV and slower movement of the positioning bumpers after they are close to (or in contact with) a UAV. In the embodiments described herein, there are two positioning bumpers (one on each side of the conveyor belt). Each positioning bumper can be moved toward the UAV such that the IR beam is interrupted on each positioning bumper. When both IR beams have been interrupted, the UAV management system can determine the distance traveled by each positioning bumper. Based on the information regarding the distance traveled, the UAV management system can calculate the distance between the two positioning bumpers, which represents the width of the UAV in its current orientation. If the UAV management system knows the dimensions of the UAV, it can determine the current rotation (or orientation) of the UAV.

In some embodiments, the systems and methods described herein use one or more UAV sensors (e.g., camera, GPS (Global Positioning System) sensor, or IMU (Inertial Measurement Unit) sensor) to determine the UAV's position and orientation on the landing platform. For example, a camera mounted to the UAV (or integrated into the UAV) can assist in determining the current position and orientation of the UAV on the landing platform. This information can be communicated to UAV management system 108 or other systems to determine whether the UAV needs to be reoriented and/or repositioned on the landing platform. The information may also be useful in determining which UAV cradle should receive the UAV. The communication between the UAV and other systems, such as UAV management system 108, may include communication with any number of servers, flight control systems, UAV fleet managers, and the like.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A landing platform system comprising:
  a conveyor belt configured to support at least one unmanned aerial vehicle (UAV), the conveyor belt further configured to controllably move in a first direction and a second direction that is opposite the first direction;
  a first positioning bumper configured to controllably actuate between a first extended position and a first retracted position;
  a second positioning bumper configured to controllably actuate between a second extended position and a second retracted position;
  a plurality of cradles each configured to selectively receive and secure an individual UAV of the at least one UAV supported by the conveyor belt, and each further configured to controllably provide one or more support functions to the individual UAV once selectively received and secured; and
  a processor configured to:
    selectively control actuation of the first positioning bumper and the second positioning bumper to position a first UAV of the at least one UAV on the conveyor belt,
    determine a characteristic of the first UAV,
    determine which of the plurality of cradles are currently empty,
    determine one or more of the one or more support functions that can be provided by each of the plurality of cradles that are currently empty based on the characteristic of the first UAV,
    select a particular cradle of the plurality of cradles that are empty as a destination for the first UAV based on the characteristic of the first UAV and the one or more of the one or more support functions that can be provided by the particular cradle,
    selectively control the conveyor belt, the first positioning bumper, and the second positioning bumper to adjust a rotational orientation of the first UAV to align the first UAV on the conveyor belt such that the first UAV aligns with the particular cradle,
    detect that the first UAV aligns with the particular cradle, and
    upon detecting that the first UAV aligns with the particular cradle, selectively control the conveyor belt to move in the first direction or the second direction depending on which direction the particular cradle is in relative to the first UAV, selectively control the particular cradle to receive and secure the first UAV, and selectively control the particular cradle to controllably provide the one or more of the one or more support functions that can be provided by the particular cradle to the first UAV.

2. The landing platform system of claim 1, wherein:
  when the processor selects the particular cradle of the plurality of cradles that are empty as the destination for the first UAV based on the characteristic of the first UAV and the one or more of the one or more support functions that can be provided by the particular cradle, the processor first determines a priority for each of the one or more support functions that can be provided by each of the plurality of cradles that are currently empty based on the characteristic of the first UAV, and selects the particular cradle of the plurality of cradles based on the priority of each of the one or more support functions that can be provided by each of the plurality of cradles that are currently empty; and when the processor selectively controls the particular cradle to controllably provide the one or more of the one or more support functions that can be provided by the particular cradle, the processor further utilizes the priority for each of the one or more of the one or more support functions that can be provided by the particular cradle.

3. The landing platform system of claim 1, wherein the first positioning bumper and the second positioning bumper are selectively controlled to operate as at least one pivot point wherein a movement of the conveyer belt one of pulls or pushes the first UAV to change the rotational orientation of the first UAV on the conveyor belt about the at least one pivot point.

4. The landing platform system of claim 1, wherein the particular cradle includes at least one mechanical grasper configured to engage a support structure of the first UAV to receive and secure the first UAV to the particular cradle.

5. The landing platform system of claim 1, wherein the landing platform system further comprises a delivery vehicle that carries at least one item to be delivered by the at least one UAV, and wherein the conveyor belt, the first positioning bumper, the second positioning bumper, the processor, and the plurality of cradles are each mounted in, on, or to the delivery vehicle.

6. The landing platform system of claim 1, wherein the conveyer belt includes corrugations oriented orthogonal to a direction of travel of the at least one UAV on the conveyor belt, the corrugations configured to reduce slippage of the at least one UAV on the conveyor belt.

7. The landing platform system of claim 1, wherein the landing platform system further comprises the at least one UAV.

8. The landing platform system of claim 1, wherein the first positioning bumper comprises a first bumper arm and the second positioning bumper comprises a second bumper arm.

9. A landing platform comprising:
a conveyor belt configured to support at least one unmanned aerial vehicle (UAV), the conveyor belt further configured to controllably move in a first direction and a second direction that is opposite the first direction;
a first positioning bumper;
a second positioning bumper, wherein the first positioning bumper and the second positioning bumper are each configured to controllably actuate between an extended position and a retracted position;
a first cradle provided on a first side of the conveyor belt, the first cradle configured to, when currently empty, controllably receive a first UAV of the at least one UAV when the conveyer belt moves the first UAV in the first direction, and to controllably provide one or more first support functions to the first UAV once received;
a second cradle provided on a second side of the conveyer belt, the second cradle configured to, when currently empty, controllably receive the first UAV of the at least one UAV when the conveyer belt moves the first UAV in the second direction, and to controllably provide one or more second support functions to the first UAV once received; and
a processor configured to:
selectively control actuation of the first positioning bumper and the second positioning bumper to position the first UAV of the at least one UAV on the conveyor belt,
determine a characteristic of the first UAV,
determine whether the first cradle is currently empty,
determine whether the second cradle is currently empty,
when the first cradle is currently empty and the second cradle is not currently empty, control the conveyor belt to move in the first direction,
when the second cradle is currently empty and the first cradle is not currently empty, control the conveyor belt to move in the second direction,
when the first cradle is currently empty and the second cradle is currently empty, select either the first cradle and control the conveyor belt to move in the first direction or the second cradle and control the conveyor belt to move in the second direction, wherein the selection is based on at least the characteristic of the first UAV,
selectively control the conveyor belt, the first positioning bumper, and the second positioning bumper to adjust a rotational orientation of the first UAV to align the first UAV on the conveyor belt such that the first UAV aligns with either the first cradle when the conveyor belt moves in the first direction or the second cradle when the conveyor belt moves in the second direction,
selectively control either the first cradle when the first UAV aligns with the first cradle or the second cradle when the first UAV aligns with the second cradle, to receive the first UAV, and
selectively control either the first cradle to provide the one or more first support functions to the first UAV when the first UAV has been received by the first cradle or the second cradle to provide the one or more second support functions to the first UAV when the first UAV has been received by the second cradle.

10. The landing platform of claim 9, wherein the selection by the processor based on at least the characteristic of the first UAV is further based on comparing a first association between the characteristic of the first UAV and the one or more first support functions with a second association between the characteristic of the first UAV and the one or more second support functions.

11. The landing platform of claim 10, wherein the conveyor belt is configured to move the first UAV toward the first cradle when moving in the first direction or toward the second cradle when moving in the second direction such that the first UAV engages with the one of the first cradle or the second cradle when the first UAV reaches a respective edge of the conveyor belt.

12. The landing platform of claim 9, wherein the first positioning bumper and the second positioning bumper are selectively controlled to operate as at least one pivot point wherein a movement of the conveyer belt one of pulls or pushes the first UAV to change the rotational orientation of the first UAV on the conveyer belt about the at least one pivot point.

13. The landing platform of claim 9, wherein one of the one or more first support functions or the one or more second support functions includes enabling the first UAV to one of load or unload a payload when received by the one of the first cradle or the second cradle.

14. The landing platform of claim 9, wherein the landing platform further comprises a delivery vehicle that carries at least one item to be delivered by the at least one UAV, and wherein the conveyor belt, the first positioning bumper, the second positioning bumper, the processor, and the plurality of cradles are each mounted in, on, or to the delivery vehicle.

15. A method comprising:
- receiving a first unmanned aerial vehicle (UAV) on a landing platform;
- selectively controlling actuation of a first positioning bumper and a second positioning bumper each between an extended position and a retracted position to position the first UAV on a conveyor belt of the landing platform configured to controllably move in a first direction and a second direction that is opposite the first direction;
- determining a characteristic of the first UAV at a processor of the landing platform;
- determining, at the processor, whether a first cradle of the landing platform at a first end of the conveyor belt is currently empty;
- determining, at the processor, whether a second cradle of the landing platform at a second end of the conveyor belt, opposite the first end, is currently empty;
- when the first cradle is currently empty and the second cradle is not currently empty, controlling, using the processor, the conveyor belt to move in the first direction;
- when the second cradle is currently empty and the first cradle is not currently empty, controlling, using the processor, the conveyor belt to move in the second direction;
- when the first cradle is currently empty and the second cradle is currently empty, selecting, by the processor, either the first cradle and controlling the conveyor belt to move in the first direction, or the second cradle and controlling the conveyor belt to move in the second direction, wherein the selection by the processor is based on at least the characteristic of the first UAV;
- selectively controlling, using the processor, the conveyor belt, the first positioning bumper, and the second positioning bumper to adjust a rotational orientation of the first UAV to align the first UAV on the conveyor belt such that the first UAV aligns with either the first cradle when the conveyor belt moves in the first direction or the second cradle when the conveyor belt moves in the second direction;
- selectively controlling, using the processor, either the first cradle when the first UAV is aligned with the first cradle or the second cradle when the first UAV is aligned with the second cradle, to receive the first UAV; and
- selectively controlling, using the processor, either the first cradle to provide one or more first support functions to the first UAV when the first UAV is received by the first cradle or the second cradle to provide one or more second support functions to the first UAV when the first UAV is received by the second cradle.

16. The method of claim 15, wherein the first positioning bumper and the second positioning bumper are selectively controlled to operate as at least one pivot point wherein a movement of the conveyor belt one of pulls or pushes the first UAV to change the rotational orientation of the first UAV on the conveyer belt about the at least one pivot point.

17. The method of claim 15, wherein at least one of the one or more first support functions or the one or more second support functions include loading or unloading a payload carried by or to be carried by the first UAV after the first UAV is received by the first cradle or the second cradle.

18. The method of claim 15, wherein at least one of the one or more first support functions or the one or more second support functions include charging a battery of the first UAV after the first UAV is received by the first cradle or the second cradle.

19. The method of claim 15, further comprising:
- receiving a second UAV on the landing platform while the first UAV is received in the first cradle, the first cradle providing the one or more first support functions to the first UAV; and
- repeating the method steps so as to have the second UAV received by the second cradle, the second cradle providing the one or more second support functions to the second UAV.

20. The method of claim 15, wherein the step of selectively controlling actuation of the first positioning bumper and the second positioning bumper to position the first UAV on the conveyor belt of the landing platform further comprises:
- selecting, by the processor, one of the first positioning bumper or the second positioning bumper;
- selectively controlling actuation of, by the processor, an unselected one of the first positioning bumper or the second positioning bumper into the retracted position; and
- selectively controlling actuation of, by the processor, the selected one of the first positioning bumper or the second positioning bumper into the extended position.

* * * * *